(12) United States Patent
Davenel et al.

(10) Patent No.: US 11,508,032 B2
(45) Date of Patent: Nov. 22, 2022

(54) BAYER MATRIX IMAGE SENSOR

(71) Applicant: SAFRAN ELECTRONICS & DEFENSE, Boulogne-Billancourt (FR)

(72) Inventors: Arnaud Davenel, Boulogne-Billancourt (FR); Michel Jouffroy, Boulogne-Billancourt (FR); Corentin Dubois, Boulogne-Billancourt (FR); Yannick Guerin, Boulogne-Billancourt (FR); Eric Robert-Charrerau, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 360 days.

(21) Appl. No.: 16/649,095

(22) PCT Filed: Sep. 21, 2018

(86) PCT No.: PCT/EP2018/075628
§ 371 (c)(1),
(2) Date: Mar. 19, 2020

(87) PCT Pub. No.: WO2019/057907
PCT Pub. Date: Mar. 28, 2019

(65) Prior Publication Data
US 2020/0294192 A1    Sep. 17, 2020

(30) Foreign Application Priority Data
Sep. 21, 2017  (FR) ..................... 17/00966

(51) Int. Cl.
*G06T 3/40* (2006.01)
*H04N 5/225* (2006.01)

(52) U.S. Cl.
CPC ......... *G06T 3/4015* (2013.01); *H04N 5/2254* (2013.01)

(58) Field of Classification Search
CPC ..................... G06T 3/4015; H04N 5/2254
See application file for complete search history.

(56) References Cited

U.S. PATENT DOCUMENTS 7,433,042 B1 *  10/2008  Cavanaugh ........... G01J 3/2823
                                                    356/419
7,680,192 B2 *  3/2010   Kaplinsky .......... H04N 5/23238
                                                    375/240.19

(Continued)

OTHER PUBLICATIONS

International Preliminary Report on Patentability received for PCT Patent Application No. PCT/EP2018/075628, dated Apr. 2, 2020, 12 pages (6 pages of English Translation and 6 pages of Original Document).

(Continued)

*Primary Examiner* — Gregory M Desire
(74) *Attorney, Agent, or Firm* — Womble Bond Dickinson (US) LLP

(57) ABSTRACT

The invention relates to an image sensor comprising: •an optical system (2a) for receiving an optical signal; •a Bayer matrix (4) located on the image focal plane of the optical system (2a), the Bayer matrix (1) comprising: a reference optical filter (B1) configured to eliminate or attenuate, in the received optical signal, a first band of wavelengths and to allow through, in the received optical signal, a second band length of wavelengths, and also eight optical filters adjacent to the reference optical filter (B1); •a phase mask (2c, 22, 28) arranged on a pupil (2b) of the optical system (2a) and configured to selectively project at least 98% of the energy of the optical signal carried in the first band of wavelengths and 98% of the energy of the optical signal carried in the second band of wavelengths on the reference optical filter (B1) and on at least one adjacent optical filter, which is configured to allow through, in the received optical signal, the first band of wavelengths.

15 Claims, 9 Drawing Sheets

(56) References Cited

U.S. PATENT DOCUMENTS

| | | | |
|---|---|---|---|
| 8,842,216 B2* | 9/2014 | Fest | G01J 3/513 |
| | | | 348/360 |
| 9,503,616 B2* | 11/2016 | Taniguchi | H04N 5/217 |
| 10,848,681 B2* | 11/2020 | Tang | H04N 5/2256 |
| 2007/0252908 A1 | 11/2007 | Kolehmainen | |
| 2010/0200730 A1 | 8/2010 | Yukawa | |
| 2016/0037097 A1* | 2/2016 | Duparre | H04N 5/3577 |
| | | | 348/241 |

OTHER PUBLICATIONS

International Search Report and Written Opinion received for PCT Patent Application No. PCT/EP2018/075628, dated Oct. 17, 2018, 14 pages (6 pages of English Translation and 8 pages of Original Document).

Preliminary Research Report received for French Application No. 1700966, dated Jul. 4, 2018, 4 pages (1 page of French Translation Cover Sheet and 3 pages of original document).

* cited by examiner

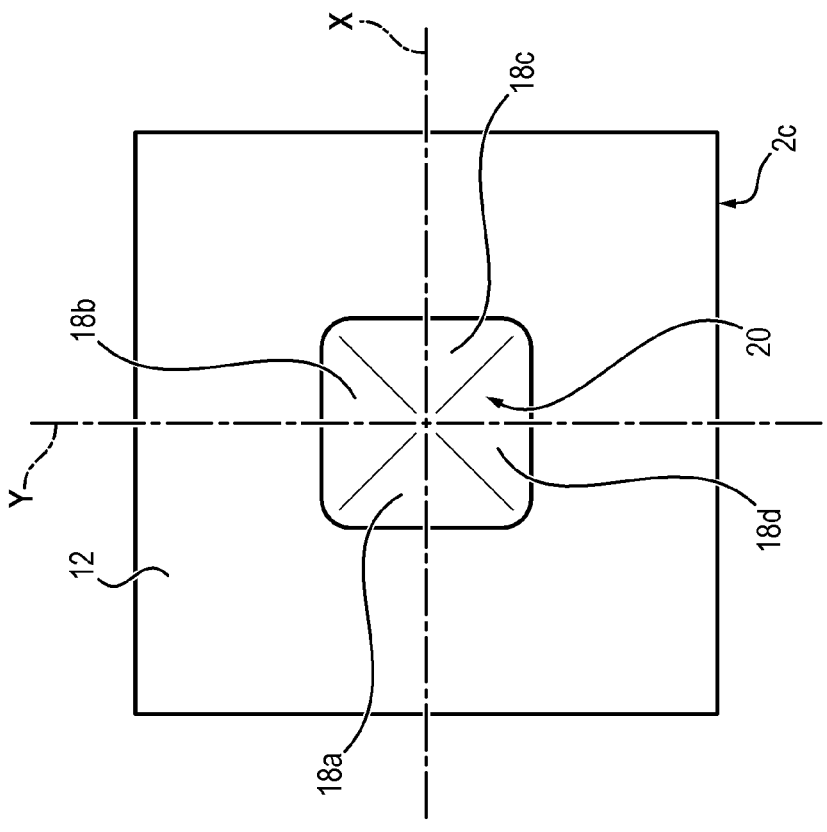
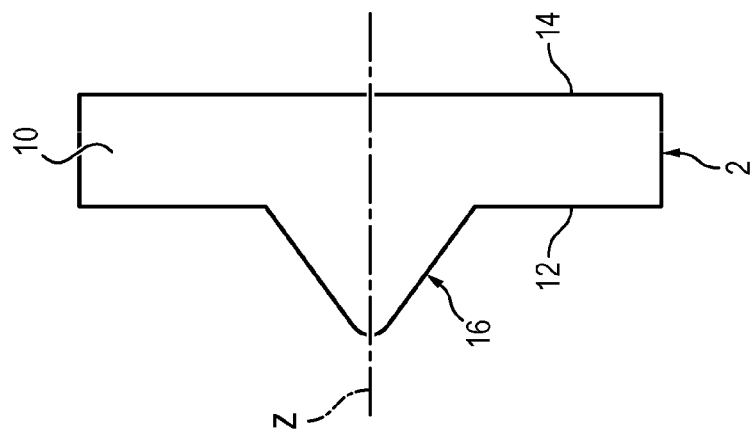

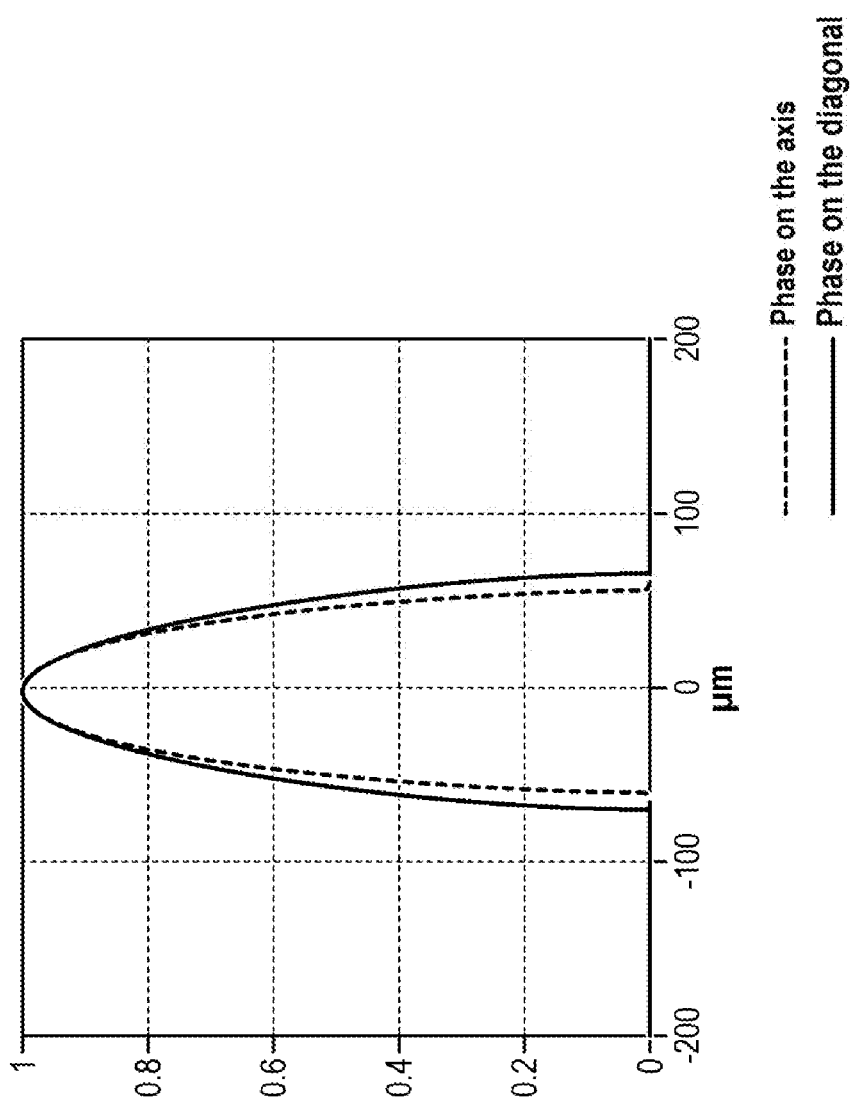

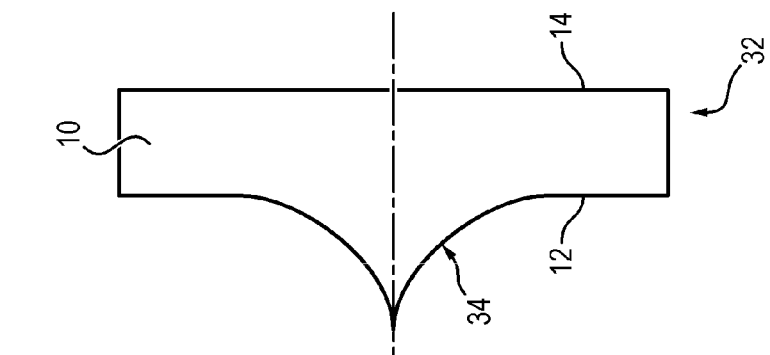
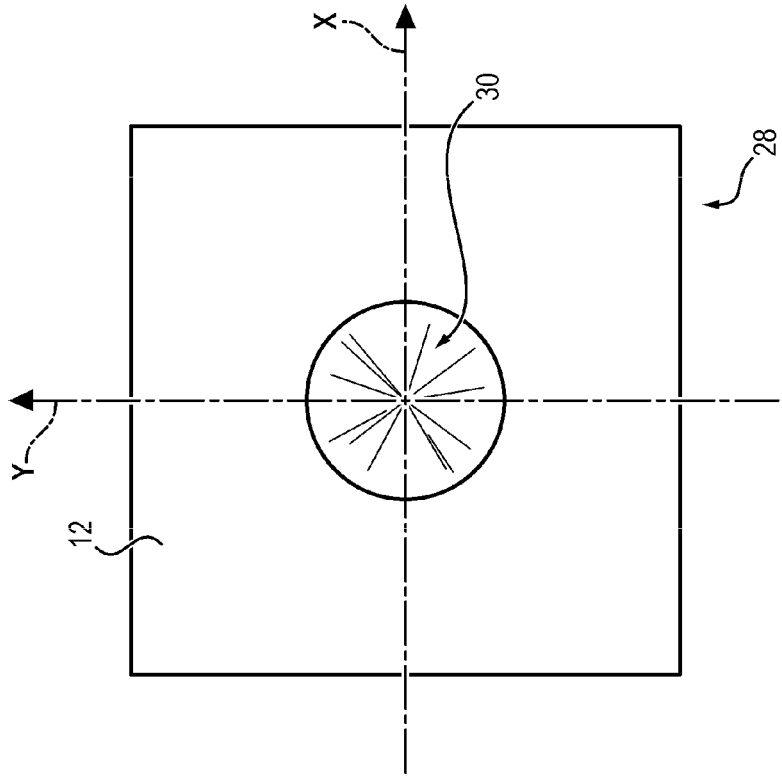
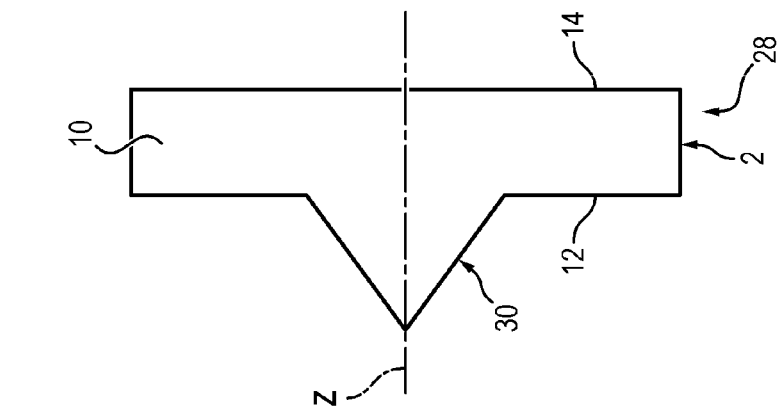

BAYER MATRIX IMAGE SENSOR

FIELD OF THE INVENTION

The present invention relates to an image sensor comprising a Bayer matrix.

STATE OF THE ART

It is known from the state of the art an image sensor comprising a Bayer matrix and a photo-detector arranged downstream of the Bayer matrix.

In a known manner, a Bayer matrix comprises a plurality of optical filters disposed in a checkerboard pattern and sensitive to different wavelengths. Thus, a Bayer matrix conventionally comprises at least the following nine optical filters:
- a reference optical filter, configured to eliminate or attenuate, in a received optical signal, a first wavelength band comprising a first wavelength $\lambda_1$, but to allow through a second wavelength band comprising a second wavelength $\lambda_2$,
- eight optical filters adjacent to the reference optical filter, four of which are configured to allow through, in the received optical signal, the first wavelength band and to eliminate or attenuate the second wavelength band.

The photo-detector arranged downstream of the Bayer matrix allows reconstructing an image, each pixel of the image corresponding to one of the optical filters of the Bayer matrix. Thus, a reference pixel of the image is specifically associated with the reference filter above.

The reconstructed image carries information in the two spectral bands to which the Bayer matrix is sensitive.

Particularly, the reference pixel of the image is assigned a color from a first piece of information relating to the first wavelength band, and from a second piece of information relating to the second wavelength band.

The second piece of information is provided directly by the photo-detector, since the reference optical filter allows through this second band.

However, the first piece of information cannot be obtained in the same way, since the reference optical filter eliminates or at least attenuates this first band. Also, this first piece of information is obtained indirectly by combining the information relating to the first wavelength band into pixels adjacent to the reference pixel, these adjacent pixels being associated with adjacent optical filters allowing through the first wavelength band.

In the literature, the step of reconstructing, for each pixel from the information available in said pixel or in its vicinity, the data of each of the wavelength bands, is conventionally called "demosaicing" (or "debayering" by neologism). When the wavelength bands are close, for example in a visible application in which a Bayer matrix having red-green-blue (RGB) filters is used, known demosaicing algorithms implement an analysis of a local gradient and overlook the dispersion of the optical impulse response generated by the Bayer matrix (also called "Optical Point Spread Function", abbreviated as OPSF).

There are two main reasons for explaining the reasons for this approach. The theory shows that the optimal optical impulse response (i.e. limited by the diffraction) is an Airy pattern whose first dark ring has a diameter equal to 2.44*lambda*N, where lambda is the considered wavelength and N is the F number of the system (N=focal length/diameter of the entrance pupil).

In the case of a Bayer matrix in the visible range, the mid-wavelengths of the RGB spectral bands are relatively not distant from each other and, moreover, the OPSFs (related to the optical qualities of the optical filters forming the Bayer matrix) are far from the limit of the diffraction. This leads to OPSFs associated with the RGB spectral bands similar enough to overlook their differences.

However, in other applications, the OPSFs at the different wavelength bands to which the Bayer matrix is sensitive can be significantly different; in a first example, when the wavelength bands are distant from each other; in a second example, when the optical qualities of the optical filters constituting the Bayer matrix are such that the similarity of the OPSFs is no longer a realistic approximation. The demosaicing implemented for Bayer matrices operating in the visible range, and overlooking the differences in OPSF therefore can no longer be used to reconstruct an image.

These difficulties are encountered especially when $\lambda_1/\lambda_2=\frac{1}{2}$, where $\lambda_1$ is comprised in the first band and $\lambda_2$ is comprised in the second band. Such a ratio can occur in particular when the first band is chosen in the infrared band "SWIR" (Short-wavelength infrared) and the second band is chosen in the infrared band "MWIR" (Mid-wavelength infrared).

In such a configuration, the similar optical qualities in the state of the art lead to similar OPSFs (for example close to diffraction) with respect to the wavelength band for each considered wavelength band, and therefore at a ratio of 2 between the radial dimensions of the OPSFs. From the energy spatial distribution point of view, this means that for a same infinite point energy, the illuminated surface at the level of the matrix of photo-detectors is about four times smaller in the first band than in the second band.

A first way to get around the problem would be to adjust the F number N to the first wavelength band by increasing it, for example by a factor of 2 compared to the $N_{initial}$ which would have been chosen for the optimal configuration for the second wavelength band. However, this would result in spreading by a factor of 2 the radial dimension of the OPSFs without making them similar (in the sense of diffraction) from one wavelength band to another, in decreasing by a factor of 4 the energy density deposited per unit area at the photo-detector and in increasing by a factor of 4 the exposure time relative to the configuration with $N_{initial}$.

A second way would be to design an optical system having an F number $N_1$ for the first wavelength band and an F number $N_2$ for the second wavelength band, such as $N_1=N_2/2$. The OPSFs of the two length bands would thus be similar (in the sense of diffraction) but the required exposure time of the first wavelength would increase by a factor of 4 relative to the configuration $N_1=N_2$.

A third way would be to voluntarily introduce optical aberrations in the design of the optical system, especially for the rays of the first spectral band, in order to make the OPSFs of the two wavelength bands similar. The disadvantage of this solution is that it leads to OPSFs that are not spatially co-located in the imagery range.

DISCLOSURE OF THE INVENTION

An object of the invention is to allow the reconstruction of a multi-spectral image by an image sensor using a Bayer matrix sensitive to two wavelength bands and generating significant optical impulse response dispersion.

Another object of the present invention is to propose an image sensor making the images reconstructed in two such wavelength bands similar so that the image processing unit can evaluate the intensities received in each spectral band by each element of the image plane.

Yet another object of the present invention is to modulate the compromise between the F number, the exposure time and the dimension of the photo-detector used in an image sensor using a Bayer matrix.

It is thus proposed, according to a first aspect of the invention, an image sensor comprising:
- an optical system for receiving an optical signal, the optical system comprising a pupil,
- a Bayer matrix located in the image focal plane of the optical system, the Bayer matrix comprising: a reference optical filter configured to eliminate or attenuate, in the received optical signal, a first wavelength band and to allow through, in the received optical signal, a second wavelength band, and also eight optical filters adjacent to the reference optical filter,
- a phase mask arranged on the pupil and configured to project at least 98% of the optical signal energy carried in the first wavelength band and 98% of the optical signal energy carried in the second wavelength band selectively onto the reference optical filter and onto at least one adjacent optical filter which is configured to allow through, in the received optical signal, the first wavelength band.

The image sensor according to the first aspect of the invention may also comprise the following optional characteristics, taken alone or in combination when technically possible.

In a first embodiment, the phase mask is configured to project at least 98% of said energy selectively onto the reference optical filter and two of the adjacent optical filters; each of the two adjacent optical filters is further configured to allow through, in the received optical signal, the first wavelength band and to eliminate or attenuate, in the received optical signal, the second wavelength band.

At least 49% of said energy can then be projected onto the reference optical filter and at most 24.5% of said energy can be preferably projected onto each of the two adjacent optical filters.

Furthermore, the phase mask can have a planar surface and comprise a boss in the shape of a triangular prism protruding from the planar surface, the boss preferably comprising two free faces connected by a rounded part.

In a second embodiment, the phase mask is configured to project at least 98% of said energy selectively onto the reference optical filter and four of the adjacent optical filters; each of the four adjacent optical filters is then configured to allow through, in the received optical signal, the first wavelength band.

The phase mask according to this second embodiment can be configured to project at least 32% of said energy onto the reference optical filter.

In addition, the phase mask can have a planar surface and moreover a boss protruding from the planar surface, the boss having four planar faces opposed in pairs and preferably connected by rounded parts.

Furthermore, this boss can have an invariant shape by a 90-degree rotation about an axis normal to the planar surface.

In a third embodiment, the phase mask is configured to project at least 98% of said energy selectively onto the reference optical filter B1 and the eight adjacent optical filters.

The phase mask can then be configured to project at least 29% of said energy onto the reference optical filter.

In addition, the phase mask can be configured to project at least 58% of said energy onto four of the adjacent optical filters, and each of the four adjacent optical filters be configured to eliminate or attenuate, in the received optical signal, a second wavelength band different from the first band.

The phase mask may have a planar surface and comprises a central boss protruding from the planar surface over a first height, as well as an annular boss also protruding from the planar surface over a second height smaller than the first height, the annular boss extending around and away from the central boss.

The phase mask may have a planar surface and comprises a boss protruding from the planar surface, wherein the boss is conical or has a concave tapered shape.

Each boss can be of revolution about an axis normal to the planar surface.

According to a second aspect of the invention, a method for acquiring an image by an image sensor is proposed, comprising an optical system for receiving an optical signal, a Bayer matrix located in the image focal plane of the optical system, the Bayer matrix comprising a reference optical filter configured to eliminate or attenuate, in a received optical signal, a first wavelength band, and eight optical filters adjacent to the reference optical filter, the method being characterized by a projection, by a phase mask arranged on a pupil of the optical system, of at least 98% of the optical signal energy carried in the first wavelength band and 98% of the optical signal energy carried in the second wavelength band selectively onto the reference optical filter and onto at least one of the eight adjacent optical filters, the Bayer matrix being located in the image focal plane of the phase mask.

DESCRIPTION OF THE FIGURES

Other characteristics, objects and advantages of the invention will emerge from the following description which is purely illustrative and not limiting and which should be read in relation to the appended drawings in which:

FIGS. 4 and 5 are respectively a side view and a front view of a phase mask according to a first embodiment of the invention.

FIG. 6 represents two phase-shift curves of an optical signal passing through the phase mask according to the first embodiment of the invention.

FIGS. 13 and 14 are respectively a side view and a front view of a phase mask according to a third embodiment of the invention.

FIG. 15 is a side view of a phase mask according to a fourth embodiment of the invention.

In all of the figures, similar elements bear identical references.

DETAILED DESCRIPTION OF THE INVENTION

Figure 1:
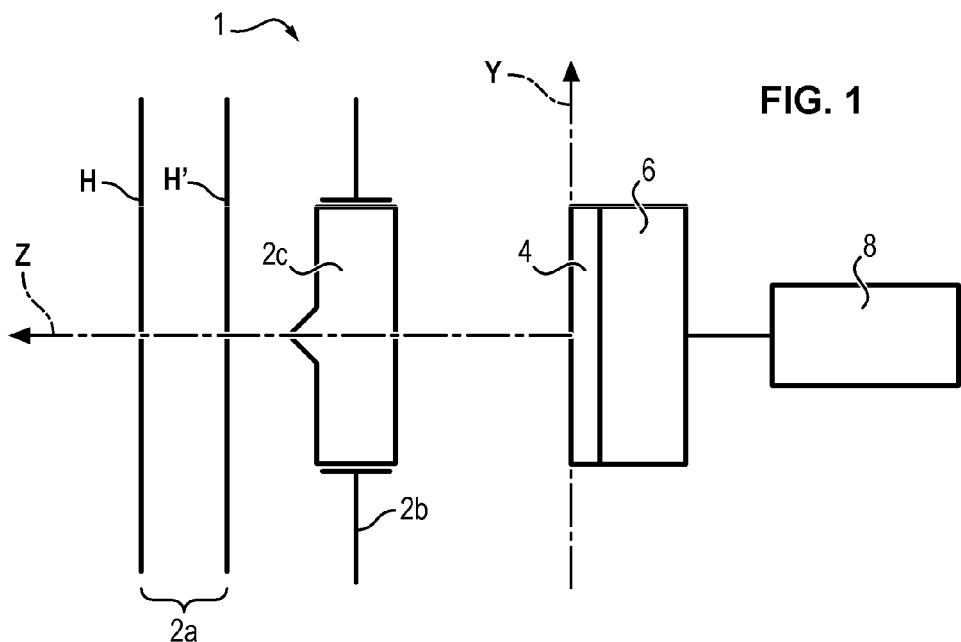
FIG. 1 is a schematic profile view of some components of an image sensor according to one embodiment of the invention.

Referring to FIG. 1, an image sensor 1 comprises an optical system 2a represented here by its main planes H and H', a pupil of the optical system 2b, a phase mask 2c, a Bayer matrix 4, a photo-detector 6 and an image processing unit 8.

The Bayer matrix 4 is conventional. It comprises a plurality of optical filters arranged on a rectangular grid of dimensions N×M along a plane defined by two axes: an X-axis and a Y-axis perpendicular to the X-axis (only the Y-axis being visible in FIG. 1).

The photo-detector 6 is arranged downstream of the Bayer matrix 4.

The photo-detector 6 is conventional and typically comprises a photosensitive surface covered by the Bayer matrix 4.

The photo-detector 6 is adapted to generate, for each optical filter of the Bayer matrix 4, an electrical signal from an optical signal having passed through the optical filter.

The image processing unit 8, also conventional, is configured to apply to the various electrical signals generated by the photo-detector 6 an image processing known per se allowing the construction of an image consisting of N×M pixels, each pixel corresponding to one of the optical filters of the Bayer matrix 4.

The image processing unit 8 comprises for example at least one processor executing an image processing program configured for this purpose.

The optical system 2a and the phase mask 2c have an optical axis Z.

The optical system 2a is arranged upstream of the Bayer matrix 4, so that the Bayer matrix 4 is in the image focal plane of the optical system 2a. The image focal plane of the optical system 2a is therefore the plane (X, Y).

The phase mask 2c is positioned upstream of the Bayer matrix 4 and preferably arranged on a pupil of the optical system 2b.

The pupil 2b can be indifferently the entrance pupil, i.e. the image of the aperture diaphragm through the portion of the optical system 2a located upstream, or the exit pupil, i.e. the image of the aperture diaphragm through the portion of the optical system located downstream, or an intermediate pupil, i.e. the image of the aperture diaphragm for only one portion of the elements of the optical system. Those skilled in the art will recognize the usual definitions and will know that the entrance, exit and intermediate pupils are the conjugates of each other by the elements of the optical system that separate them.

The phase mask 2c is arranged so as to be able to transmit the optical signal of the different wavelength bands. In the following, a first band comprising the wavelength $\lambda_1$ and a second band comprising the wavelength $\lambda_2$ will be considered.

The phase mask 2c is designed so as to introduce in the pupil a set of homogeneous path differences $\Phi_{DM}$, at optical thicknesses, usually given in metric units "meter".

The phase mask 2c is designed such that the set of path differences $\Phi_{DM}$ seen by each wavelength band correspond to two phase-shifts $\Delta_{\lambda_1}$ and $\lambda_{\lambda,2}$, usually measured in radians. In the particular case where $\lambda_1/\lambda_2=\frac{1}{2}$, it is obvious to those skilled in the art that $\Delta_{\lambda,2}=\Delta_{\lambda_1}/2$.

It should be noted that each of the phase-shifts can be implemented modulo $(2^+\pi)$, and therefore be written $\Delta_{\lambda,n}=\Delta_{\lambda,n}{}^{ref}+k^+2^+\pi$, with k being an integer. By default in the following embodiments, k will be taken equal to 0 and $\Delta_{\lambda,n}=\Delta_{\lambda,n}{}^{ref}$.

Figure 2:
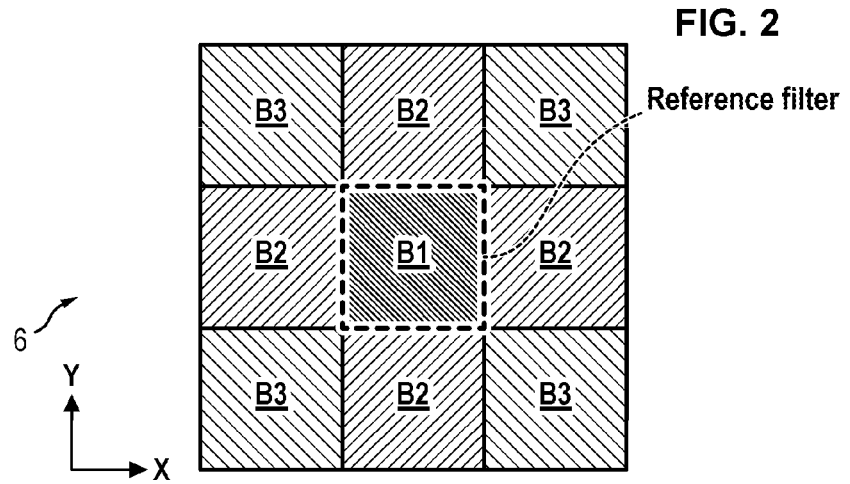
FIGS. 2 and 3 are partial front views of a Bayer matrix.

Referring to FIG. 2, the Bayer matrix 4 comprises at least the nine following optical filters:
- a reference optical filter B1, configured to eliminate or attenuate, in a received optical signal, a first wavelength band, but to allow through a second wavelength band,
- eight optical filters B2, B3 adjacent to the reference optical filter B1.

The nine filters B1, B2, B3 are aligned so as to form a 3×3 checkerboard pattern, for example squared when the optical filters are themselves squared.

The eight adjacent optical filters B2, B3 comprise four first adjacent optical filters B2 configured to allow through, in the received optical signal, the first wavelength band, and to eliminate or attenuate the second wavelength band. The four first adjacent filters B2 are connected to the filter B1: they are arranged respectively to the left of, to the right of, above and below the filter B1.

The eight adjacent optical filters B2, B3 also comprise four second adjacent optical filters B3 configured to allow through, in the received optical signal, the second wavelength band, and to eliminate or attenuate the first wavelength band. They are therefore of the same type as the reference filter B1. The four second adjacent filters B2 are arranged at the four corners of the 3×3 checkerboard formed by the nine filters B1, B2, B3.

For example, the first band is chosen from the infrared band "SWIR" (Short-wavelength infrared) and the second band is chosen from the infrared band "MWIR" (Mid-wavelength infrared).

Figure 3:
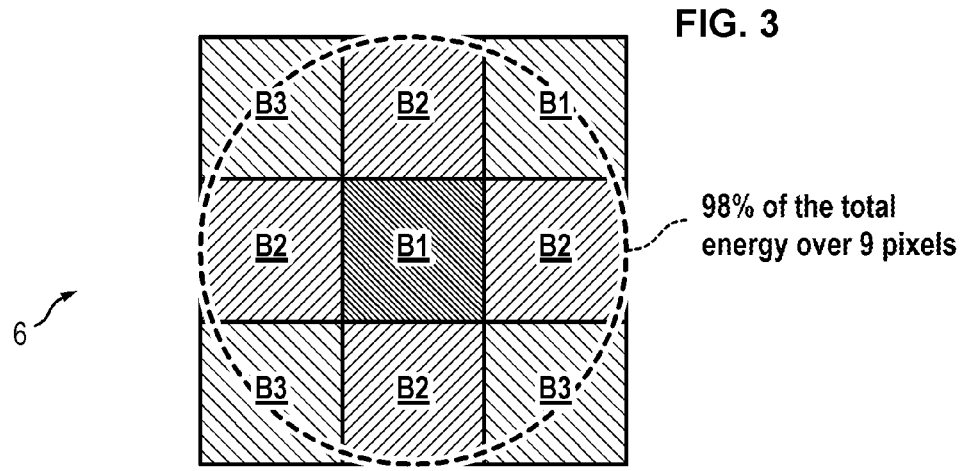

The phase mask 2c is configured to project at least 98% of the energy carried by an optical signal in the first wavelength band and 98% of the energy carried by an optical signal in the second wavelength band selectively onto the reference optical filter B1 and on at least one of the eight adjacent optical filters B2 and B3. Conventionally, "useful energy" is called hereinafter the 98% of this total energy. The area of the Bayer matrix 4 in which this useful energy is projected is inscribed in the circle drawn in dotted lines in FIG. 3.

The image of a point by an optical system not being a point but a diffraction pattern which, at best, is an Airy pattern whose dimensions are imposed by the wavelength of the radiation, its size defined at the first minimum of this profile (starting from the center of the pattern, also called 1$^{st}$ dark ring) is usually considered. The integral of the energy on this disc centered on the pattern corresponds to approximately 98% of the total energy.

FIGS. 4 and 5 represent a first embodiment of phase mask 2c that allows implementing such a projection.

The phase mask 2c according to this first embodiment is in the form a phase plate 10 comprising an upstream surface 12 and a downstream surface 14 opposite to the upstream surface 12. The two surfaces 12, 14 are oriented so that the optical signal enters the plate 10 through the upstream surface 12 and exits through the downstream surface 14. The downstream surface 14 is arranged facing the Bayer matrix 4.

The two surfaces 12, 14 are planar and extend in respective planes parallel to the plane (X, Y) of the Bayer matrix 4.

The phase mask 2c comprises a boss 16 protruding from the upstream planar surface 12. The boss 16 has four planar faces opposed by pairs 18a-18d. The faces 18a-18d are interconnected by rounded parts 20. These rounded parts have the effect of avoiding uncontrolled diffraction peaks.

The boss has an overall shape of pyramid 18a-18d with four faces, whose edges and apex would be machined to form the rounded parts 20.

The boss 16 has an invariant shape by a 90-degree rotation about the axis Z normal to the upstream planar surface 12.

The boss 16 is not of revolution: it has a first measured width parallel to the X-axis or Y-axis, and a second measured width along a diagonal axis of the X-axis and Y-axis and which is larger than the first width.

The dimensions of the boss are adapted so that the phase mask 2c phase-shifts an optical signal in the first wavelength band (comprising $\lambda_1$) according to the following phase-shift d, function of the incidence coordinates (x,y) of this optical signal on the upstream surface of the phase mask 2c:

$$d = \Delta\lambda1(x,y)/\pi = \max(1 - 0.80 * \sin(x^2 + y^2) + 0.84 * \cos(x^4 + y^4), 0)$$

As illustrated in FIG. 6, the phase-shift curve in the plane (X,Z) or in the plane (Y,Z) is different from the phase-shift curve induced by the phase mask 2c in a plane defined by the Z-axis but rotated by 45° about the Z-axis relative to the plane (X,Z).

Figure 8:
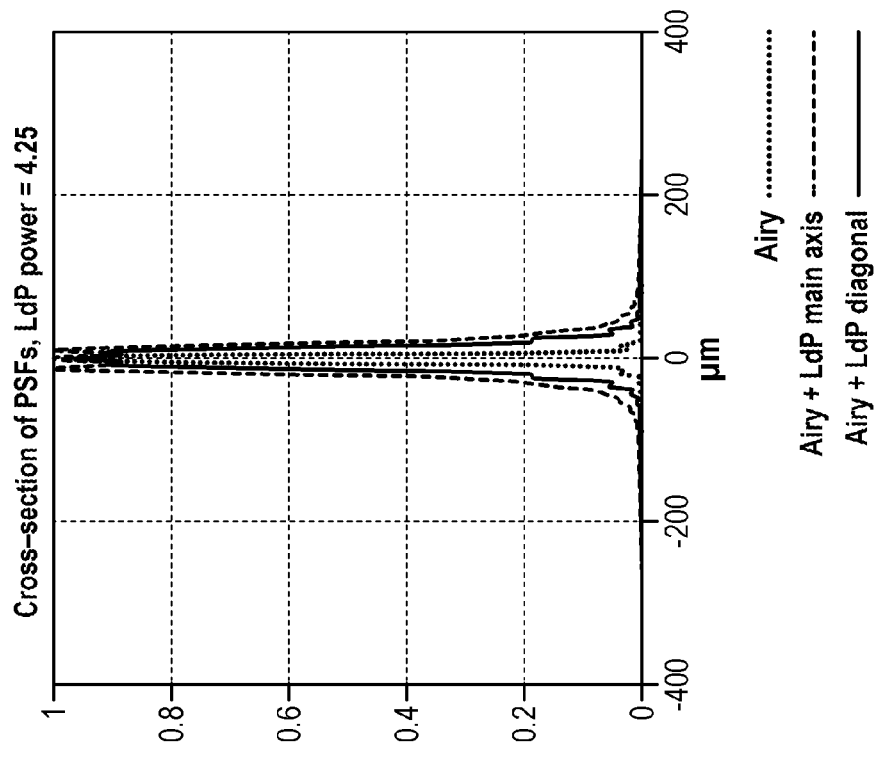
FIG. 8 shows two point spread curves associated with the phase-shift curves represented in FIG. 6.
Figure 7:
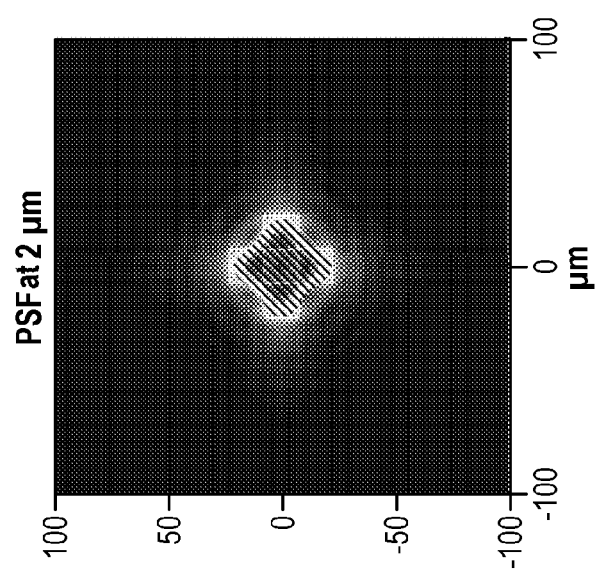
FIG. 7 represents the point spread function of the phase mask according to the first embodiment of the invention.

The point spread function (impulse response) of the phase mask 2c for the optical signal in the first wavelength band is represented in FIGS. 7 and 8. Note that this function defines a cross in a plane parallel to the plane (X, Y).

Figure 9:
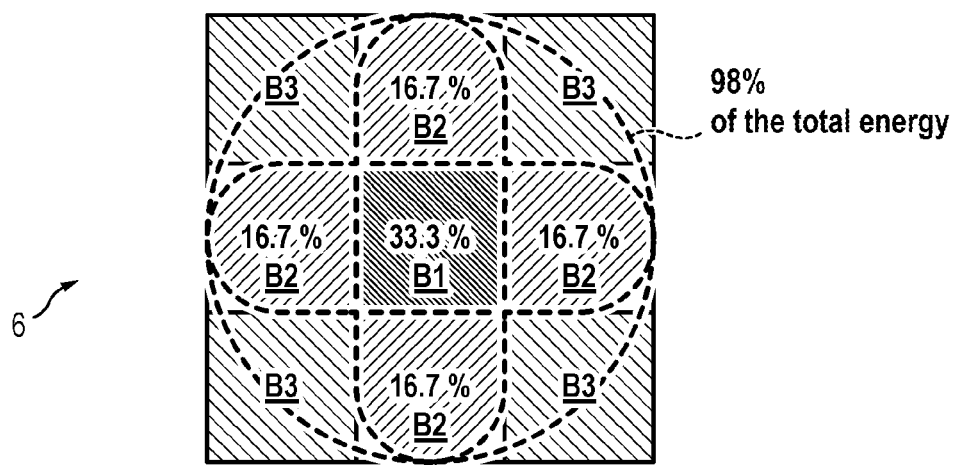
FIG. 9 is a partial front view of a Bayer matrix, also showing a distribution of energy projected onto this Bayer matrix by the phase mask according to the first embodiment of the invention.

Consequently, an optical signal having passed through the phase mask 2c can be selectively projected onto a cross-shaped area selectively covering the reference optical filter B1 and the four first adjacent optical filters B2, as represented in FIG. 9. In this embodiment, the four other adjacent optical filters B3 therefore do not receive useful energy (therefore do not receive energy carried by the optical signal in the first wavelength band.

Preferably, the phase mask 2c (in particular its boss 16) has a shape adapted so that at least 50% of the useful energy is projected onto the reference optical filter B1, which corresponds to at least 49% of the total energy carried by the optical signal in the first wavelength band.

Preferably, the phase mask 2c (in particular its boss 16) has a shape adapted so that each of the four first optical filters B2 receives at least 16.7% of the useful energy (therefore corresponding to at least 16.3% of the total energy).

The phase mask is for example made of ZnS, with an optical index $n_{\lambda1-\lambda2} = 2.265$ for $\lambda_1 = 2.1$ μm and $\lambda_2 = 4.2$ μm.

Let R the distance between the considered point of the phase mask 2c and the center of the pupil, i.e. the distance between the considered point of the phase mask 2c and the optical axis Z illustrated in FIG. 1, and E the thickness of the phase plate between its two surfaces 12 and 14, measured parallel to the Z-axis. For example, when the pupil has a radius of 10 mm, the thickness of the phase mask 2c is chosen as follows:

For R∈[0 mm; 1.626 mm]: E+2.493 μm
$\Phi_{DM} = 2.493 * (2.265 - 1) = 3.15$ μm
$\Delta_{\lambda,1}/\pi = 3 = 1$ and $\Delta_{\lambda,2}/\pi = 1.5$ For R∈[1.626 mm; 6.335 mm]: E
$\Phi_{DM} = 0$ μm
$\Delta_{\lambda,1}/\pi = 0$ and $\Delta_{\lambda,2}/\pi = 0$ For R∈[6.335 mm; 10 mm]: E+0.831 μm
$\Phi_{DM} = 0.831 * (2.265 - 1) = 1.04$ μm
$\Delta_{\lambda,1}/ = 1$ and $\Delta_{\lambda,2}/\pi = 0.5$ The operation of the image sensor 1 is as follows.

An optical signal is received by the image sensor 1. This optical signal enters the phase mask 2c through its upstream surface 12 and in particular its boss 16. The optical signal passes through the plate 10 and exits through the downstream surface 14. During this passage, the optical signal undergoes a phase-shift. The optical signal is then projected onto the Bayer matrix 4, selectively onto the reference optical filter B1 and the four first adjacent optical filters B2.

The reference optical filter B1 attenuates or eliminates, in the optical signal it receives, the first wavelength band comprising $\lambda_1$, but allow through the second wavelength band comprising $\lambda_Z$. The optical signal thus filtered is detected by the photo-detector 6, converted into an electrical signal, then transmitted to the image processing unit 8.

In addition, each of the first optical filters B2 attenuates or eliminates, in the optical signal it receives, the second wavelength band comprising $\lambda_2$, but allow through the first wavelength band comprising $\lambda_1$. The optical signal thus filtered is detected by the photo-detector 6, converted into an electrical signal then transmitted to the image processing unit 8.

The five electrical signals generated by the photo-detector 6 are combined according to a method known per se by the image processing unit to produce a color associated with a pixel of an image.

In the foregoing, it has been assumed that the Bayer matrix comprises only 9 optical filters disposed in a 3×3 checkerboard pattern. Of course, the Bayer matrix can comprise considerably more optical filters. The image sensor then comprises not just one mask 2, but as many masks 2 as there are optical filters comprising 8 neighboring ones in the Bayer matrix 4, and therefore likely to be considered as reference optical filters B1.

The above steps are thus implemented for each optical filter likely to be considered as a reference optical filter, so as to obtain at the outlet of the image processing unit 8, a plurality of pixel colors, the pixels forming a complete image.

Figure 11:
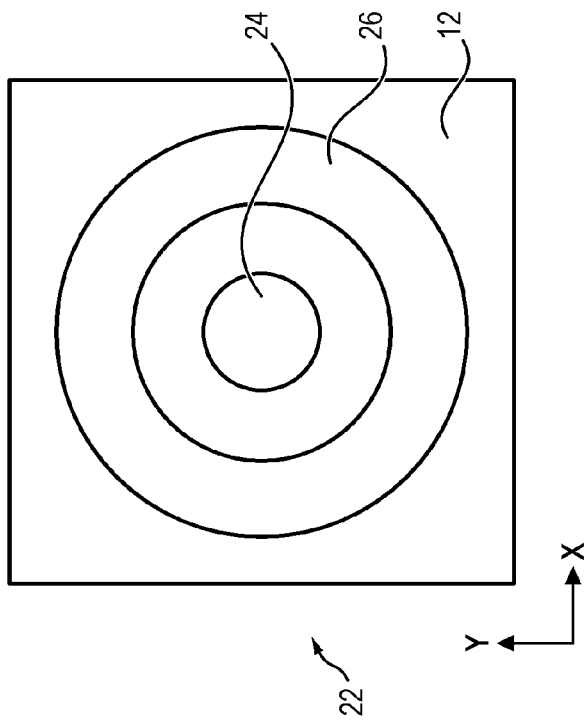
FIGS. 10 and 11 are respectively a perspective view and a front view of a phase mask according to a second embodiment of the invention.
Figure 10:
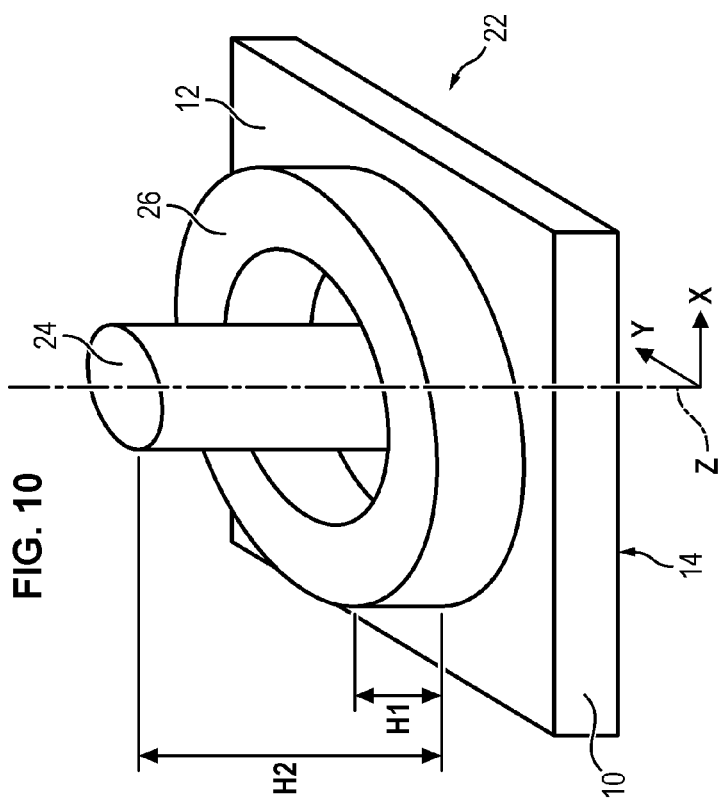

FIGS. 10 and 11 represent a second embodiment of a phase mask 22 that allows implementing a projection of 98% of the energy of an optical signal carried in the first wavelength band selectively onto the reference optical filter B1 and onto at least one adjacent optical filter. This phase mask 22 can replace the phase mask 2c in the sensor represented in FIG. 1.

The phase mask 22 differs from the phase mask 2c according to the first embodiment by the fact that it comprises two bosses 24, 26 each protruding from the upstream planar surface 12, and not just one: a central boss 24 and a peripheral boss 26.

The central boss 24 has a cylindrical shape of revolution about the Z-axis. The central boss 24 has a flat top parallel to the upstream surface 12. The central boss has a height measured parallel to the Z-axis between the upstream surface and its top equal to a value H1.

The peripheral boss 26 has an annular or crown shape of revolution about the Z-axis. This peripheral boss 26 is located around and away from the central boss 24. The peripheral boss 26 has a flat top parallel to the upstream surface 22. The peripheral boss 26 has a height measured parallel to the Z-axis between the upstream surface and its top equal to a value H2 smaller than H1.

Figure 12:
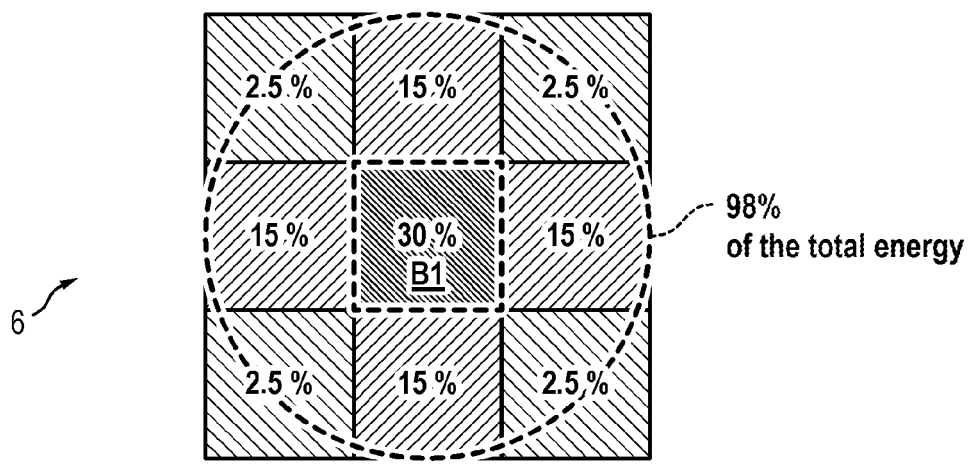
FIG. 12 is a partial front view of a Bayer matrix, also showing a distribution of energy projected onto this Bayer matrix by the phase mask according to the second embodiment of the invention.

The phase mask 22 according to this second embodiment is adapted to project the useful energy throughout the circle whose perimeter is drawn in dotted lines in the FIG. 12. In other words, unlike the phase mask 2c according to the first embodiment, energy is received by the nine optical filters B1, B2, B3 when the phase mask 22 is used.

Preferably, the shape of the bosses 24, 26 is adjusted so that the phase mask 22 projects at least one third of the useful energy onto the reference optical filter B1 (therefore at least 29% of the total energy carried by the optical signal in the first wavelength band).

Preferably, the shape of the bosses 24, 26 is adjusted so that the phase mask 22 projects at least 60% of the useful energy onto the four adjacent optical filters (which represents about 58% of the total energy). For example, the Z-axis passes through the center of the reference filter, so that each of the four adjacent optical filters receives 15% of the useful energy. The four other adjacent optical filters each receive in this case 2.5% of the useful energy.

The phase mask 22 according to the second embodiment has the advantage of being simpler to manufacture than the mask 2 according to the first embodiment.

FIGS. 13 and 14 represent a third embodiment of a phase mask 28 that allows implementing a projection of 98% of the optical signal energy carried in the first wavelength band selectively onto the reference optical filter B1 and the eight adjacent optical filters B2, B3, just like the mask 22 according to the second embodiment.

Like the mask 2 according to the first embodiment, this phase mask 28 comprises a single boss 30 protruding from the upstream planar surface 12. This boss 30, however, has a conical shape of revolution about the Z-axis. The profile of this boss is triangular in a plane perpendicular to the upstream surface, as shown in FIG. 12.

FIG. 15 represents a fourth embodiment of a phase mask 2c that allows implementing a projection of 98% of the optical signal energy carried in the first wavelength band selectively onto the reference optical filter B1 and the eight adjacent optical filters B2, B3, just like the masks 22 and 28 according to the second and third embodiments.

Like the mask according to the first embodiment, this mask phase 2c comprises a single boss 34 each protruding from the upstream planar surface. This boss 34, however, has a concave tapered shape. The profile of this boss in a plane perpendicular to the upstream surface is not triangular but curved, as shown in FIG. 14.

Figure 16:
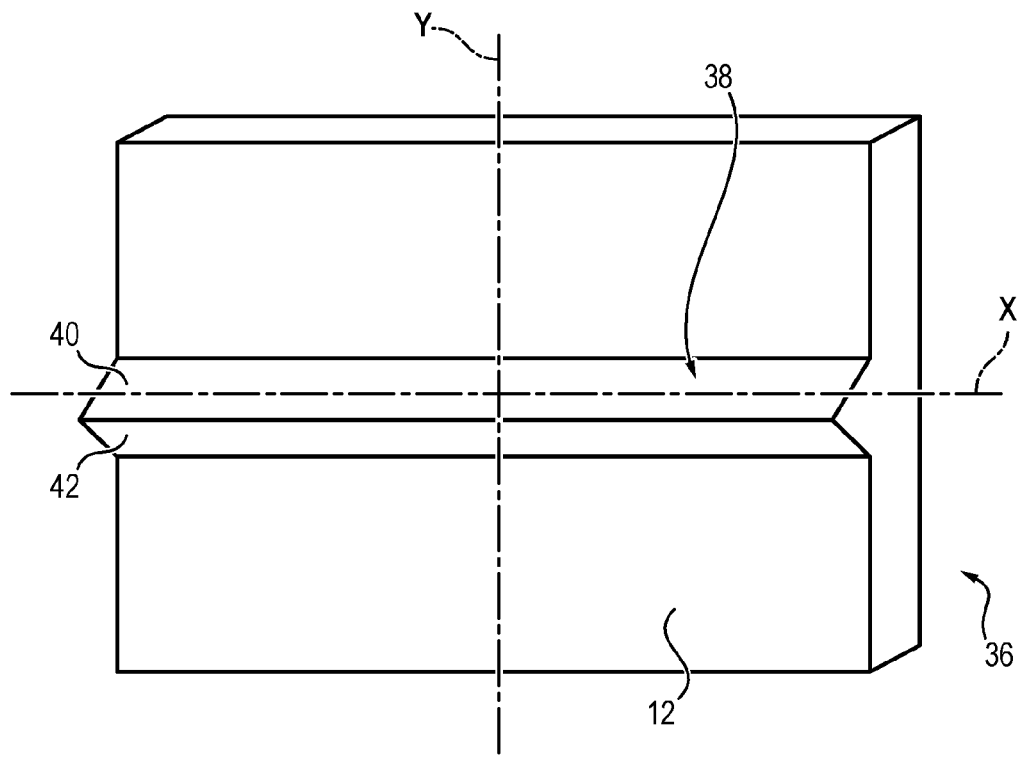
FIG. 16 is a perspective view of a phase mask according to a fifth embodiment of the invention.

FIG. 16 represents a fifth embodiment of a phase mask 36 that allows implementing the expected projection of the useful energy.

The phase mask 36 has a profile identical to that of the mask 2c represented in FIG. 5. The mask 36 indeed has a boss 38 with a generally triangular profile protruding from the upstream surface 12. Nevertheless, the boss 38 has a general shape of triangular and non-pyramidal prism.

This triangular prism is defined by a generatrix parallel to one of the two X-axis or Y-axis of the Bayer matrix.

The boss comprises two rectangular free faces 40, 42 connected by an edge located away from the upstream surface 12 (these two free faces corresponding to two of the three faces of the prism, the last face being in the plane of the upstream surface 12).

Preferably, the two free faces 40, 42 are not connected by an edge but by a rounded part, and/or each of the two free faces 40, 42 is connected to the planar surface 12 by a rounded part. These rounded parts have the effect of avoiding uncontrolled diffraction peaks.

When the phase mask 36 is used in the image sensor 1 represented in FIG. 1, this mask 36 projects an incident optical signal onto only the reference optical filter B1 and two first adjacent optical filters B2 that are related to the reference filter B1. These three filters are aligned parallel to one of the two X-axis or Y-axis.

Figure 17:
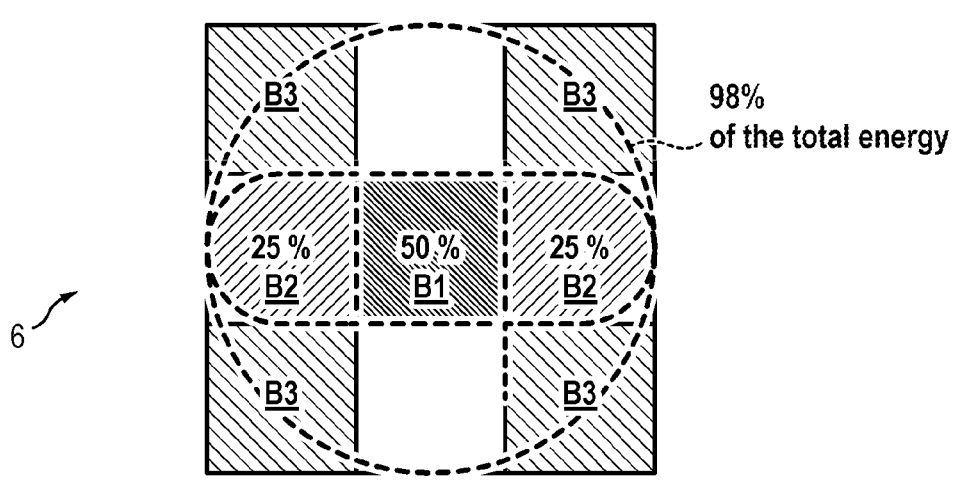
FIG. 17 is a partial front view of a Bayer matrix, also showing a distribution of energy projected onto this Bayer matrix by the phase mask according to the fifth embodiment of the invention.

Preferably, the phase mask 36 is adapted for at least 50% of the useful energy on the reference optical filter B1 (therefore at least 49% of the total energy carried by the optical signal in the first wavelength band). The two optical filters B2 immediately to the left and to the right (or respectively at the top and at the top bottom) of the filter B1 each receive at least 25% of the useful energy, as illustrated in FIG. 17.

The invention claimed is:

1. An image sensor comprising:
an optical system for receiving an optical signal, the optical system comprising a pupil,
a Bayer matrix located in an image focal plane of the optical system, the Bayer matrix comprising a reference optical filter and eight optical filters adjacent to the reference optical filter, wherein the reference optical filter is configured to eliminate or attenuate, in the received optical signal, a first wavelength band and to allow through, in the received optical signal, a second wavelength band,
a phase mask arranged on the pupil and configured to project at least 98% of the optical signal energy carried in the first wavelength band and 98% of the optical signal energy carried in the second wavelength band selectively onto the reference optical filter and onto at least one of the adjacent optical filters which is configured to allow through, in the received optical signal, the first wavelength band.

2. The image sensor according to claim 1, wherein the phase mask is configured to project at least 98% of said energy selectively onto the reference optical filter and two of the adjacent optical filters, and wherein each of the two adjacent optical filters is configured to allow through, in the received optical signal, the first wavelength band and to eliminate or attenuate, in the received optical signal, the second wavelength band.

3. The image sensor according to claim 2, wherein at least 49% of said energy is projected onto the reference optical filter and wherein at most 24.5% of said energy is preferably projected onto each of the two adjacent optical filters.

4. The image sensor according to claim 1, wherein the phase mask has a planar surface and comprises a boss having a triangular prism protruding from the planar surface.

5. The image sensor according to claim 1, wherein the phase mask is configured to project at least 98% of said energy selectively onto the reference optical filter and four of the adjacent optical filters, and wherein each of the four adjacent optical filters is configured to allow through, in the received optical signal, the first wavelength band.

6. The image sensor according to claim 5, wherein the phase mask is configured to project at least 32% of said energy onto the reference optical filter.

7. The image sensor according to claim 5, wherein the phase mask has a planar surface and further comprises a boss protruding from the planar surface, wherein the boss has four planar faces opposed in pairs.

8. The image sensor according to claim 7, wherein the boss has an invariant shape by a 90-degree rotation about an axis normal to the planar surface.

9. The image sensor according to claim 1, wherein the phase mask is configured to project at least 98% of said energy selectively onto the reference optical filter and the eight adjacent optical filters.

10. The image sensor according to claim 9, wherein the phase mask is configured to project at least 29% of said energy onto the reference optical filter.

11. The image sensor according to claim 9, wherein the phase mask is configured to project at least 58% of said energy onto four of the adjacent optical filters, and wherein each of the four adjacent optical filters is configured to eliminate or attenuate, in the received optical signal, a second wavelength band different from the first band.

12. The image sensor according to claim 9, wherein the phase mask has a planar surface and comprises a central boss protruding from the planar surface over a first height, as well as an annular boss also protruding from the planar surface over a second height smaller than the first height, the annular boss extending around and away from the central boss.

13. The image sensor according to claim 12, wherein the central boss and the annular boss are of revolution about an axis normal to the planar surface.

14. The image sensor according to claim 9, wherein the phase mask has a planar surface and comprises a boss protruding from the planar surface, wherein the boss is conical or has a concave tapered shape.

15. A method for acquiring an image by an image sensor comprising an optical system for receiving an optical signal, a Bayer matrix located in an image focal plane of the optical system, the Bayer matrix comprising a reference optical filter configured to eliminate or attenuate, in the received optical signal, a first wavelength band, and eight optical filters adjacent to the reference optical filter, wherein the method comprises projecting, by a phase mask arranged on a pupil of the optical system, at least 98% of the optical signal energy carried in the first wavelength band and 98% of the optical signal energy carried in the second wavelength band selectively onto the reference optical filter and onto at least one of the eight adjacent optical filters, the Bayer matrix being located in an image focal plane of the phase mask.

* * * * *